US010506005B2

(12) United States Patent
McGinnity et al.

(10) Patent No.: US 10,506,005 B2
(45) Date of Patent: Dec. 10, 2019

(54) INTERMEDIATE NETWORK ENTITY FOR CONTROLLING BANDWIDTH FOR AN ADAPTIVE BIT RATE STREAM

(71) Applicant: Openwave Mobility Inc., Redwood City, CA (US)

(72) Inventors: Shaun McGinnity, Belfast (GB); Christopher Brown, Belfast (GB)

(73) Assignee: Openwave Mobility Inc., Redwood City, CA (US)

( * ) Notice: Subject to any disclaimer, the term of this patent is extended or adjusted under 35 U.S.C. 154(b) by 37 days.

(21) Appl. No.: 15/260,040

(22) Filed: Sep. 8, 2016

(65) Prior Publication Data

US 2017/0078348 A1 Mar. 16, 2017

(30) Foreign Application Priority Data

Sep. 10, 2015 (GB) .................................. 1516071.6

(51) Int. Cl.
| | |
|---|---|
| *H04L 29/06* | (2006.01) |
| *H04N 21/2343* | (2011.01) |
| *H04N 21/2385* | (2011.01) |
| *H04N 21/462* | (2011.01) |
| *H04N 21/845* | (2011.01) |
| *H04N 21/222* | (2011.01) |

(Continued)

(52) U.S. Cl.
CPC ............ *H04L 65/601* (2013.01); *H04L 65/80* (2013.01); *H04L 67/28* (2013.01); *H04L 67/42* (2013.01); *H04N 21/222* (2013.01); *H04N 21/2385* (2013.01); *H04N 21/23418* (2013.01); *H04N 21/23439* (2013.01); *H04N 21/4621* (2013.01); *H04N 21/8456* (2013.01)

(58) Field of Classification Search
CPC ....... H04L 65/601; H04L 67/42; H04L 67/28; H04L 65/80; H04N 21/222; H04N 21/23418; H04N 21/4621; H04N 21/2385; H04N 21/23439; H04N 21/8456
See application file for complete search history.

(56) References Cited

U.S. PATENT DOCUMENTS

| | | | |
|---|---|---|---|
| 2005/0213586 A1* | 9/2005 | Cyganski | ............ H04L 41/0896 370/395.41 |
| 2009/0089456 A1* | 4/2009 | Stanton | ................. H04J 3/0632 709/248 |
| 2011/0314130 A1 | 12/2011 | Strasman | |

(Continued)

*Primary Examiner* — Michael A Keller
(74) *Attorney, Agent, or Firm* — EIP US LLP

(57) ABSTRACT

There is described a method for controlling bandwidth between a client and a content server in a data network. The method is implemented by an intermediate network entity that is between the client and the content server in the data network. A dataflow between the content server and the client is monitored and based on the monitoring, the dataflow is categorized as being an Adaptive Bit Rate (ABR) streaming dataflow that comprises segments of media data of a particular quality variant of a plurality of quality variants potentially available at the content server. A different quality variant of the plurality of quality variants is selected as a target quality variant and a bandwidth value is determined to apply to the dataflow to try to cause the client to request segments of media data of the target quality variant for the dataflow. The determined bandwidth value is applied to the dataflow.

17 Claims, 8 Drawing Sheets

(51) Int. Cl.
*H04N 21/234* (2011.01)
*H04L 29/08* (2006.01)

(56) References Cited

U.S. PATENT DOCUMENTS

| | | | |
|---|---|---|---|
| 2012/0254455 A1* | 10/2012 | Adimatyam | H04N 21/44209 709/231 |
| 2013/0007471 A1* | 1/2013 | Grab | G06F 21/10 713/193 |
| 2014/0269323 A1* | 9/2014 | Mahindra | H04W 28/12 370/236.1 |
| 2014/0282765 A1* | 9/2014 | Casey | H04N 21/2225 725/93 |
| 2015/0032854 A1 | 1/2015 | Wang et al. | |
| 2015/0071075 A1* | 3/2015 | Ramakrishnan | H04L 65/4069 370/236 |
| 2015/0085875 A1 | 3/2015 | Phillips et al. | |
| 2016/0044342 A1* | 2/2016 | Imanishi | H04N 21/262 725/109 |
| 2016/0248835 A1* | 8/2016 | Petrangeli | H04L 65/608 |

\* cited by examiner

| VARIANT | RESOLUTION (Horizontal Lines of Vertical Resolution) | Recorded expected Average Media playback data rate (Mbps) | Recorded expected Average Response Size (Mb) | Segment Playback Duration (Seconds) |
|---|---|---|---|---|
| Var1 | 1080p | 0.4 | 4 | 10 |
| Var2 | 720p | 0.2 | 2 | 10 |
| Var3 | 480p | 0.1 | 1 | 10 |
| Var4 | 360p | 0.05 | 0.5 | 10 |
| Var 5 | 240p | 0.025 | 0.25 | 10 |

INTERMEDIATE NETWORK ENTITY FOR CONTROLLING BANDWIDTH FOR AN ADAPTIVE BIT RATE STREAM

CROSS-REFERENCE TO RELATED APPLICATIONS

This application claims the benefit under 35 U.S.C. § 119(a) and 37 CFR § 1.55 to UK Patent Application No. 1516071.6, filed on Sep. 10, 2015, the entire content of which is incorporated herein by reference.

BACKGROUND OF THE INVENTION

Field of the Invention

The present invention relates to an intermediate network entity for controlling bandwidth for an adaptive bit rate (ABR) stream, for example, a HTTP adaptive video stream, being downloaded from a content server to a client.

Description of the Related Technology

Adaptive Bit Rate (ABR) streaming, for example, Hyper Text Transfer Protocol (HTTP) Adaptive Video Streaming (AVS), is a known technique used to stream video (and/or other content) over the Internet and other communications networks. In order to support ABR streaming, typically, a video server, in a communication network, makes available for download multiple variants of the same video content, each variant having one or more characteristics associated therewith that are different to those of the other versions. For example, the one or more characteristics may relate to video quality, as indicated, for example, by bit rate, or resolution that is being used.

Each variant is sub divided into a plurality of consecutive smaller multi-seconds parts known as segments or chunks. Each segment is typically between 2 to 10 seconds of duration. The video server also makes available a so called manifest file which contains information (e.g. meta-data) describing each and every available segment which is to be used by a client device in order to play back segments. A manifest file also contains a different pointer to or an address (typically a Uniform Resource Locator (URL)) for each segment of each variant of the video content, or alternatively, a different pointer to an address (again typically a URL) for each version of the video content and a byte range for each different segment within each version. This segment pointer information enables a client device to individually request segments from the server.

Prior to downloading desired ABR video content from the video server, a client device first downloads the manifest file for that video content and uses the manifest file to identify the different available versions of the video content. Based on the information in the manifest file, the client sends sequential HTTP requests for segments of the video content, the segments being of the variant that has a quality level most appropriate for the download bandwidth currently available to the client device.

Typically, in ABR streaming, a HTTP GET request will only be issued by a client device for the next segment in the sequence when the complete previous segment has been received in a HTTP RESPONSE corresponding to the previous HTTP GET request.

The client device continuously monitors the available download bandwidth and if it finds that the bandwidth has deteriorated to an extent that it is now too low for the variant of the segments currently being downloaded, the client device starts to request the next segments for displaying the video content from a lower quality variant (if available). Conversely, if it finds that the bandwidth has improved to an extent that it can accommodate a higher quality variant than that of the segments currently being downloaded, the client device starts to request the next segments for displaying the video content from a higher quality variant (if available).

Accordingly, ABR streaming enables a user device to dynamically select the best available stream according to network throughput. Requesting segments one after the other at possibly different resolutions can result in a smoother video experience for a user even if the available bandwidth varies.

Current proprietary implementations of ABR streaming include Microsoft's 'Smooth Streaming' implemented by its Silverlight player, Apple's 'HTTP Adaptive BitRate Streaming' implemented in its desktop and mobile products, and Adobe's 'HTTP Dynamic Streaming' implemented by its Flash player (v10.1 and later). All three of these implementations support H.264 as a video codec and Advanced Audio Coding (AAC) as an audio codec.

In addition, the standards body 3GPP has defined its standard 'Dynamic Adaptive Streaming over HTTP' and the standards body MPEG its standard 'Dynamic Adaptive HTTP Streaming'.

An intermediate network element, for example a proxy server in a cellular communications network, sitting in the data path between an ABR client and an ABR server can try to exercise control over the ABR client by artificially changing the bandwidth available for the connection between the ABR client and server. For example, if the intermediate network element reduces the bandwidth available for the data being download from a server to the ABR client, if possible, the ABR client will react by requesting lower quality segments. An intermediate network element may act in this way in order to prevent an ABR client consuming too much network resources.

However, in some circumstances, the ABR client may not be able to request segments that have a quality level that is low enough to ensure that they can be delivered to the ABR client over the reduced bandwidth connection quickly enough so that the video can be played without stalling. For example, sometimes, there may be not be segment variants available at the server that can be delivered in a timely fashion to the ABR client at the bandwidth set by the Intermediate network element. Alternatively, it is known that some ABR clients are configured in a 'non-adaptive mode' in which they can select to request only one type of segment variant and so cannot adapt to a reduced bandwidth.

SUMMARY

According to a first aspect of the present invention, there is provided a method for controlling bandwidth between a client and a content server in a data network, wherein the method is implemented by an intermediate network entity that is between the client and the content server in the data network; monitoring a dataflow between the content server and the client; categorizing the dataflow, based on the monitoring, as being an Adaptive Bit Rate (ABR) streaming dataflow that comprises segments of media data of a particular quality variant of a plurality of quality variants potentially available at the content server; selecting a different quality variant of the plurality of quality variants as a target quality variant; determining a bandwidth value to apply to the dataflow to try to cause the client to request segments of media data of the target quality variant for the dataflow; and applying the determined bandwidth value to the dataflow.

According to a second aspect of the present invention there is provided apparatus for an intermediate network entity for controlling bandwidth between a client and a content server in a data network, the apparatus comprising: at least one processor; and at least one memory including computer program code; the at least one memory and the computer program code being configured to with the at least one processor cause the apparatus at least to perform the steps of: monitoring a dataflow between the content server and the client; categorizing the dataflow, based on the monitoring, as being an Adaptive Bit Rate (ABR) streaming dataflow that comprises segments of media data of a particular quality variant of a plurality of quality variants potentially available at the content server; selecting a different quality variant of the plurality of quality variants as a target quality variant; determining a bandwidth value to apply to the dataflow to try to cause the client to request segments of media data of the target quality variant for the dataflow; and applying the determined bandwidth value to the dataflow.

According to a third aspect of the present invention there is provided a non-transitory computer program readable storage medium comprising a set of computer readable instructions, which, when executed by a processing system causes the system to implement a method for controlling bandwidth between a client and a content server in a data network, wherein the method is implemented by an intermediate network entity that is between the client and the content server in the data network, the method comprising: monitoring a dataflow between the content server and the client; categorizing the dataflow, based on the monitoring, as being an Adaptive Bit Rate (ABR) streaming dataflow that comprises segments of media data of a particular quality variant of a plurality of quality variants potentially available at the content server; selecting a different quality variant of the plurality of quality variants as a target quality variant; determining a bandwidth value to apply to the dataflow to try to cause the client to request segments of media data of the target quality variant for the dataflow; and applying the determined bandwidth value to the dataflow.

BRIEF DESCRIPTION OF THE DRAWINGS

Methods and systems for will now be described as an embodiment, by way of example only, with reference to the accompanying figures in which:

FIG. 5 is a schematic illustration of a database entry comprising information about ABR segment variants of an origin server;

Several parts and components appear in more than one Figure; for the sake of clarity the same reference numeral will be used to refer to the same part and component in all of the Figures.

DETAILED DESCRIPTION OF CERTAIN INVENTIVE EMBODIMENTS

Figure 1:
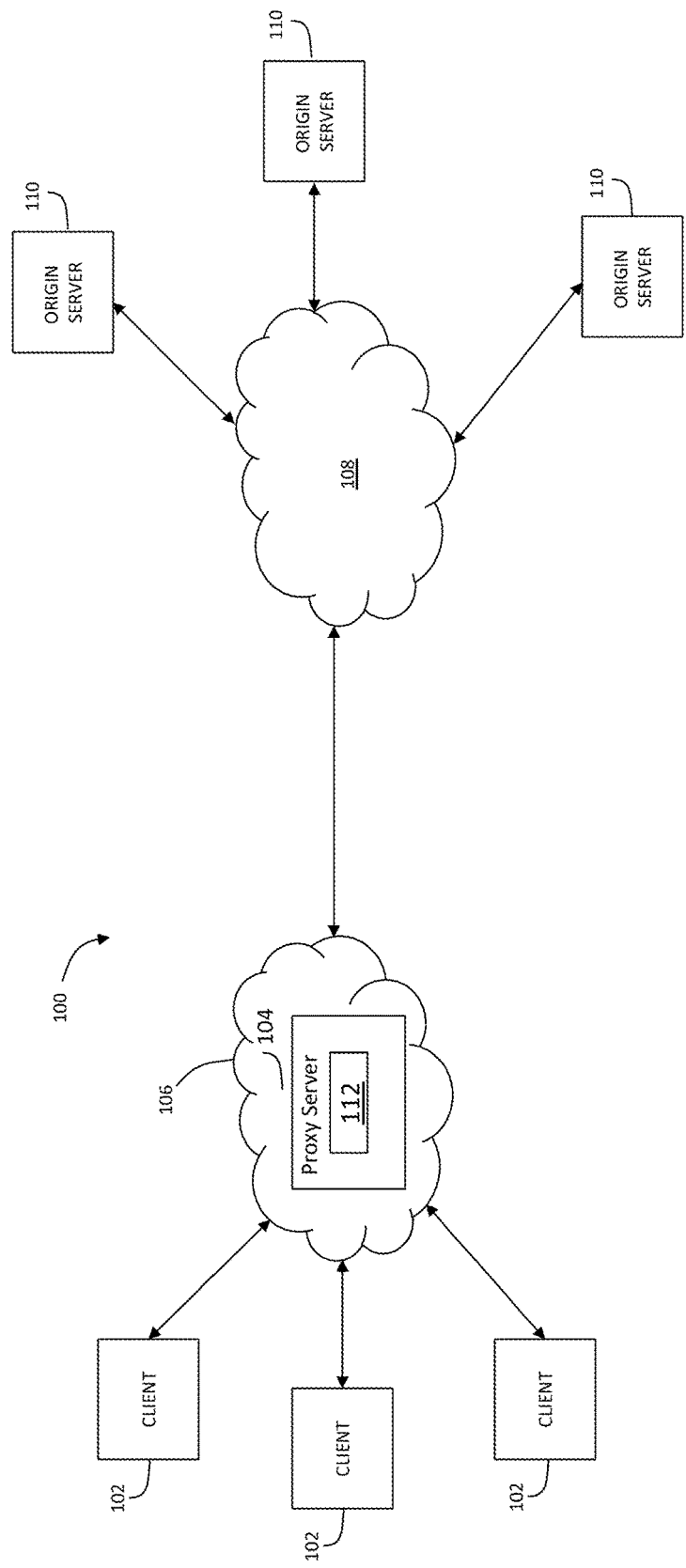
FIG. 1 is a schematic illustration of a content delivery system.

FIG. 1 depicts a content delivery system 100 in accordance with an embodiment of the invention. As described in more detail below, the content delivery system 100 includes a plurality of client devices 102, an intermediate network entity 104, access network 106, a data network 108 and a plurality of origin servers 110.

A client device 102 is any networked device including, without limitation, a mobile phone, a smart phone, a personal digital assistant (PDA), a tablet, a set-top box, a video player, a laptop, or a personal computer (PC). In one embodiment, a client device 102 is a wireless device that can support at least one of various different radio frequency (RF) communications protocols, including without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the 3rd Generation Partnership Project (3GPP) or the 3rd Generation Partnership Project 2 (3GPP2), 4G Long Term Evolution (LTE) and IEEE 802.16 standards bodies.

Although some wireless communications protocols are identified herein, it should be understood that the present disclosure is not limited to the cited wireless communications protocols. In another embodiment, a client device 102 is a wired device that communicates with the intermediate network device 104 through a communication interface, such as analog modem, ISDN modem or terminal adapter, DSL modem, cable modem, Ethernet/IEEE 802.3 interface, or a combination thereof. In another embodiment, a client device 102 is connected to the intermediate network device 104 via a combination of wireless and wired communication interfaces.

In this example, the intermediate network entity is a proxy server 104 in the data communications path between the client devices 102 and the origin servers 110. In one embodiment, the proxy is a transparent proxy that passes requests and responses (e.g., HTTP requests and responses) between client devices such as a client device 102 and host servers such as an origin server 110 without modifying the requests and responses. A proxy that simply passes requests and responses is often referred to as a gateway or tunneling proxy. In another embodiment, the proxy is a non-transparent proxy that can modify requests and responses between client devices and host servers in order to provide additional services. For example, a non-transparent proxy may provide media caching services, group annotation services, media type transformation services, or protocol reduction services.

In one embodiment, the proxy server 104 is part of the access network 106, which provides a communications interface for the client devices 102 to access the origin servers 110 via the data network 108 which may be, for example, the Internet or an intranet. Typical access networks include wireless service provider networks (e.g., that offer 3G, 4G and/or WiFi access) and Internet Service Providers (ISPs, e.g., that offer dial-up, DSL, and cable modem access). A private enterprise network can also serve as the access network if client devices within the private enterprise network can access the Internet through the private enterprise network.

In one embodiment, the access network 106 is a wireless service provider network that provides a wireless communications interface for the client device. The wireless service provider network is accessible on a subscription basis (e.g., prepaid or post-paid) as is known in the field. In an embodiment, the wireless service provider network is a closed domain that is accessible only by a subscriber (e.g. a user of the user device) that is in good standing with the operator of the wireless service provider network. Accordingly, as is well known in the field, amongst other components, the access network may 106 include a radio access network (not shown) and an Internet gateway (not shown). The radio access network includes one or more base stations to facilitate communications among wireless devices that are within a communication range of the base stations.

Each base station has at least one RF transceiver and the base stations communicate with the wireless devices using RF communication signals. The radio access network facilitates network communications among multiple wireless devices within the same wireless service provider network and between wireless devices in other wireless service provider networks and provides interfaces to facilitate communications with other entities, such as a Public Switched Telephone Network (PSTN), a Wide Area Network (WAN), the Internet, Internet servers, hosts, etc., which are outside of the wireless service provider network. In an embodiment, the wireless service provider network is operated by a single wireless service provider, such as, for example, AT&T, VERIZON, T-MOBILE, and SPRINT. The Internet gateway (not shown) of the access network provides a gateway for communications between the client device 102 and Internet-connected hosts and/or servers, which can also be referred to as the "cloud." The Internet gateway may include a Serving General Packet Radio Service (GPRS) Support Node (SGSN) and a Gateway GPRS Support Node (GGSN). In this way, the access network 106 provides access to the Internet for its subscribers.

The origin servers 110 can be any devices or systems that host digital content, which can be stored in various formats, such as video files, audio files, and/or text files. In one embodiment, an origin server 110 is an Internet-connected host or server that hosts Internet accessible content elements. The origin server may be a web server that can be accessed via, for example, HTTP, Internet Message Access Protocol (IMAP), or File Transfer Protocol (FTP). A content element is any set of digital data suitable for transfer in a networked environment, such as video files, markup language files, scripting language files, music files, image files or any other type of resource that can be located and addressed through, for example, the Internet.

In an embodiment, an origin server 110 makes available video or other content by adaptive streaming, for example, HTTP adaptive streaming. Accordingly, an origin server 110 makes available content that is divided into a plurality of segments or portions with each segment or portion being available at different resolutions or quality levels.

The proxy server 104 comprises a data flow monitoring and control component 112 that monitors a data flow between a client 102 and an origin server 110 that passes through the proxy server 104. The data flow may comprise a series of Application Layer (known as Layer 7 in the Open Systems Interconnection (OSI) model) protocol (e.g. HTTP or HTTPs) requests sent from a client 102 to an origin server 110 and a corresponding series of Layer 7 responses sent back from the origin server 110 to the client 102. In one example, the monitoring and control component 112 is able to monitor the data flow at the transport layer (i.e. Layer 4 in the OSI model) and is arranged to identify whether or not the data flow is an ABR streaming data flow.

If the dataflow is categorized as an ABR streaming data flow, the monitoring and control component 112 is arranged to further categories the ABR streaming dataflow as being one in which the media segments currently being sent to the client 102 from the origin server 110 are of a particular quality variant out of a number of different quality variants (e.g. 1080p, 720p, 480p, 360p, 240p) potentially available at the origin server 110. The monitoring and control component 112 is further arranged to select a different one of the quality variants potentially available at the origin server 110 as a target quality variant for the data flow. For example, if the monitoring and control component 112 categorizes the data flow as one in which currently segments of the 720p variant are being delivered to the client 102, the monitoring and control component 112 may select the 480p variant as the target variant for the dataflow.

The monitoring and control component 112 determines and applies a bandwidth value to a connection of the data flow in order to try to cause the client 102 to request segments of the target quality variant. Once the bandwidth value has been applied, the monitoring and control component 112 continues to monitor the data flow to determine whether or not the data flow is now one in which the media segments being sent to the client 102 from the origin server 110 are of the target quality variant.

Advantageously, in this way, the client 102 can be 'guided' into selecting a different quality variant in a way that reduces the risk of media playback at the client stalling. Furthermore, as the data flow is being monitored and controlled at layer 4, there is no requirement for the proxy server 112 to re-assemble the Layer 7 request or responses in order to read layer 7 headers or the layer 7 payload (which may not even be possible if the dataflow is encrypted) in order to monitor and/or control the dataflow.

Figure 2:
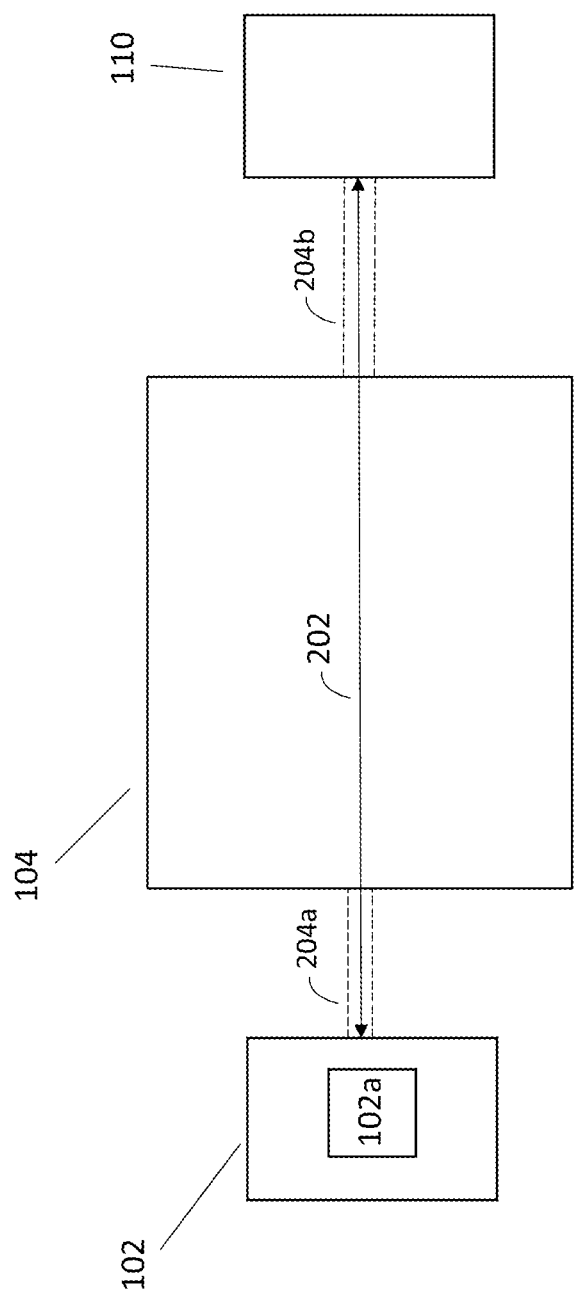
FIG. 2 is a schematic illustration of a download session involving a client application, a proxy server and an origin server.

FIG. 2 shows an example of a data download session 202 involving a client device 102, the proxy server 104 and an origin server 110. The data download session 202 is associated with an ABR client application 102a, for example, a video player running on the client device 102, which access and downloads a video file stored at the origin server 110 using an ABR streaming protocol.

In this example, the data download session is carried over a split TCP connection 204a, 204b between the client device 102 and the origin server 110. The split TCP connection comprises a first TCP connection 204a between the client device 102 and the proxy server 104 and a second TCP connection 204b between the proxy server 104 and the origin server 110. The first TCP connection 204a is defined by a client side TCP socket (not shown), at the client device 102, opened by the client application 102a and a client side socket (not shown), at the proxy server 104, opened by the proxy server 104. The second TCP connection 204b is defined by a server side TCP socket (not shown), at the proxy server 104, opened by the proxy server 104 and a server socket (not shown), at the origin server 110, opened by the origin server 110. The split TCP connection 204a, 204b as a whole is defined by the combination of the client socket at the client device 102 and the server socket at the content server 110.

The session 202 typically comprises a plurality of HTTP requests sent from the client device 102a to the origin server 110 and a plurality of corresponding HTTP responses sent in reply from the origin server 110 to the client device 102a. Each HTTP request is for a particular segment at a particular quality level (i.e. variant) of the video file being downloaded and each corresponding HTTP response contains the requested segment. Each HTTP request sent from the client device 102a for the next segment in the sequence of segments that make up the video file is only sent when the HTTP response containing the previous requested segment has been received at the client device 102a.

As is standard in TCP/IP networks, each HTTP request and each HTTP response is transported over the split TCP connection 204a, 204b in one or more TCP segments (with each TCP segment itself being transported in one or more IP packets). The proxy server 104 acts as a TCP proxy server which in respect of HTTP requests being sent from the client device 102 to the origin server 110 reads TCP payload data received at its client side socket and writes that TCP payload data to its server side socket for onwards transmission to the origin server 110 and in respect of HTTP responses being sent from the origin server 110 to the client device 102 reads TCP payload data received at its server side socket and writes that TCP payload data to its client side socket for onwards transmission to the client device 102. In this example however, the proxy server 104 does not reassemble any of the HTTP requests or HTTP responses from the TCP payload data that makes up those HTTP requests or HTTP responses.

The split TCP connection 204a, 204b may be a secure connection with the client device 102 and the origin server 110 using a suitable cryptographic protocol, for example the Transport Layer Security (TLS) protocol or the Secure Sockets Protocol (SSL) to encrypt the data that is conveyed between the two in the payloads of TCP segments.

Figure 3:
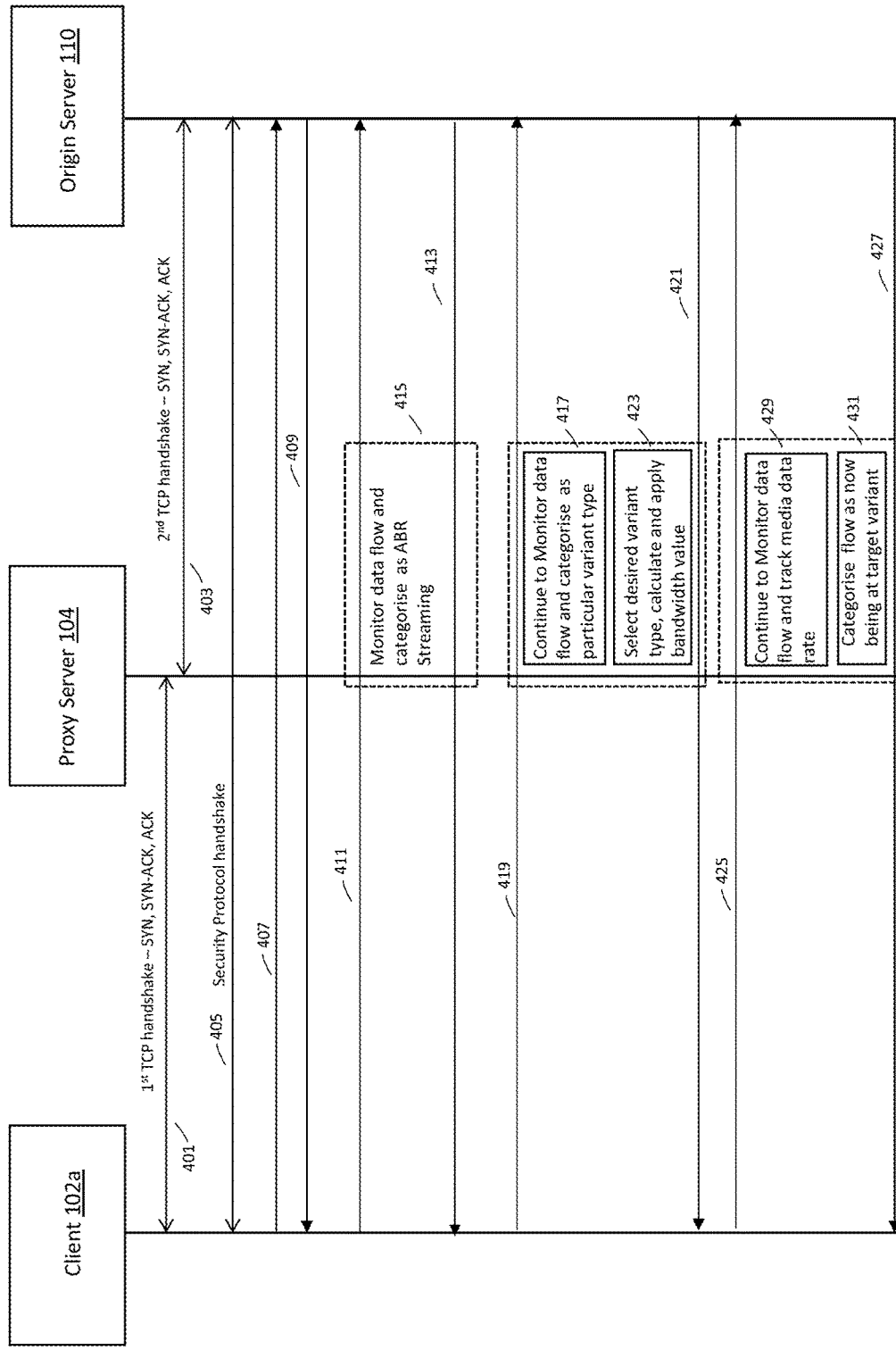
FIG. 3 is a schematic illustration of an exchange of messages in an example embodiment of the invention.

FIG. 3 illustrates an exchange of messages between the client 102a, proxy server 104 and origin server 110 in an example embodiment of the invention.

The first TCP connection 204a between the client 102a and the proxy server 104 is established using a first TCP 3-way handshake 401. The first TCP handshake 401 comprises a SYN packet sent from the client 102a to the origin server 110 but which is intercepted by the proxy server 104, a SYN-ACK sent from the proxy server 104 to the client 102a in response to the SYN, and an ACK sent from the client 102a in response to the SYN-ACK and which is also intercepted by the proxy server 104.

The second TCP connection 204b between the proxy server 104 and the origin server 110 is established using a second TCP 3-way handshake 403. The second TCP handshake 403 comprises a SYN packet sent from the proxy server 104 to the origin server 110, a SYN-ACK sent from the proxy server 104 to the origin server 110 in response to the SYN, and an ACK sent from the origin server 110 in response to the SYN-ACK.

Next, the client 102a and the origin server 110 exchange messages 405 in accordance with a handshake of a suitable security protocol, for example, SSL or TLS in order to secure the connection between the two. These messages 405 pass through the proxy server 104 which may read the messages. The messages 405 exchanged in this handshake enable the client 102a and the origin server 110 to agree on a version of the protocol to use, select cryptographic algorithms, and establish a shared secret key for encrypting/decrypting the payloads of subsequent TCP segments that will later be exchanged between the two. The handshake messages 405 may also provide the client 102a with the origin server's 110 digital certificate which the client 102a can validate in order to authenticate the origin server 110.

Once the secure connection is established, the client 102a and the origin server 110 exchange a series of HTTPs requests and corresponding HTTPs responses to download a video file using ABR streaming from the origin server to the client. All of these HTTPs requests and corresponding HTTPs responses pass through the proxy server 104.

The first HTTPs request 407 sent from the client 102a to the origin server 110 causes the origin server 110 to send back to the client 102a a first HTTPs response 409 containing a manifest file for the requested video content.

Based on the information in the manifest file, the client 102a sends a sequence of HTTPs requests 411 to the origin server 110, each HTTP request being for a respective variant of a respective one of the segments of video that together make up the video content to be downloaded. The origin server 110 responds to each HTTPs request by sending a HTTPs response containing the variant of the segment that has been requested. Although, for simplicity in FIG. 3, the sequence of HTTPs requests 411 and the sequence of HTTPs responses 413 are each shown as single arrows, it will be appreciated that, in practice, each HTTPs request sent by the client 102a will only be sent after the HTTPs response from the origin server 110 to the previous HTTPs request from the client 102a has been received by the client 102a.

The ABR streaming monitoring and control component 112 monitors 415 the data being exchanged between the client 102a and the origin server 110 and determines that the dataflow is an ABR dataflow.

In one example, the ABR streaming monitoring and control component 112 determines the dataflow is an ABR streaming dataflow by determining the data size of each of a number of HTTPs responses that pass through the proxy server 104 and determining that a predetermined criterion has been met.

It is known that HTTPs Responses carrying ABR segments tend to have a data size in the range of 102401 Bytes to 1048577 Bytes. Accordingly, in one example, the ABR streaming monitoring and control component is configured 112 to classify that a dataflow is an ABR dataflow if it determines that data size of each of a number of consecutive HTTPs responses, for example 3 consecutive responses, is in the range of 102401 Bytes to 1048577 Bytes. This response pattern in effect acts as a 'digital fingerprint' indicating that the data flow is likely an ABR dataflow. It will be appreciated that other response patterns (e.g. 5 out of 7 consecutive responses in the range of 102401 Bytes to 1048577 Bytes) may act as a 'digital fingerprint' of an ABR dataflow.

In this example, the proxy server 104 is a TCP proxy server and so the data that passes though it does so at Layer 4 (i.e. the transport layer) and that data is not re-assembled into Layer 7 HTTP requests or responses. Accordingly, the ABR monitoring and control component 112 determines the data size, or an estimate thereof, of each HTTPs response by analyzing the data flow at Layer 4. Advantageously, this approach enables the download to be identified as ABR without having to inspect the headers of the Layer 7 requests or responses for information identifying the nature of the download (which is not even possible when the requests or the responses are encrypted).

Figure 4:
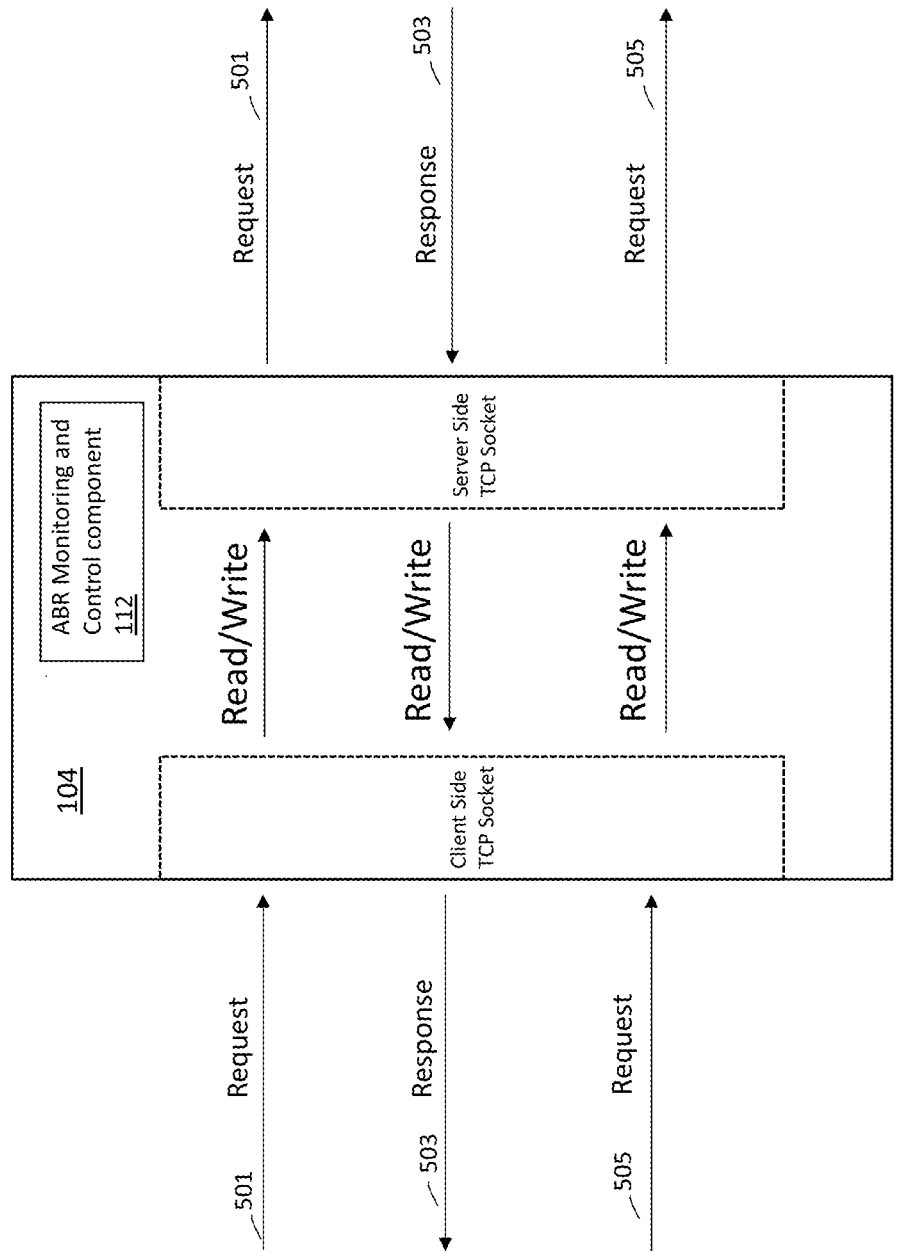
FIG. 4 is a schematic illustration of a system of monitoring data flowing at Layer 4.

FIG. 4 illustrates one example of a method by which the streaming monitoring and control component 112 may determine the data size of any given HTTPs response by monitoring data flowing at Layer 4.

In this example, the proxy server 104 receives at the client side TCP socket TCP payload data that makes up a first HTTPs request 501 from the client (not shown in FIG. 5). It will be appreciated that, in accordance with the TCP/IP protocol stack, the TCP payload data arrives at the proxy server 104 over the first TCP connection 204a encapsulated in one or more IP packets. The IP Layer at the proxy server 104 reassembles these one or more IP packets into TCP data (i.e. the IP Layer strips out the IP headers of the one or more IP packets) and presents this TCP data to the TCP layer at the proxy server 104. The TCP layer strips out the TCP headers in this TCP data to provide the TCP payload data.

The proxy server 104 reads that TCP payload data from the client side socket and writes it to the server side TCP socket for onwards transmission of data of the first HTTPs request 501 to the origin server (not shown in FIG. 5). Again, it will be appreciated that, in accordance with the TCP/IP protocol stack, the TCP layer at the proxy server 110 will add appropriate TCP headers to the TCP payload data and pass this TCP data to the IP layer at the proxy server 104 which transmits it to the origin server encapsulated in one or more IP packets.

Subsequently, the proxy server 104 then receives at the server side TCP socket TCP payload data that makes up a HTTPs response 503 to the first HTTPs request 501. Again, it will be appreciated that, in accordance with the TCP/IP protocol stack, this TCP payload data arrives at the proxy server 104 over the second TCP connection 204b encapsulated in one or more IP packets. The IP Layer at the proxy server 104 reassembles these one or more IP packets into TCP data (i.e. the IP Layer strips out the IP headers of the one or more IP packets) and presents this TCP data to the TCP layer at the proxy server 104. The TCP layer strips out the TCP headers in this TCP data to provide the TCP payload data.

The proxy server 104 reads that data from the server side TCP socket and writes it to the client side TCP socket for onwards transmission to the client. Again, it will be appreciated that, in accordance with the TCP/IP protocol stack, the TCP layer at the proxy server 104 will add appropriate TCP headers to the TCP payload data and pass this TCP data to the IP layer at the proxy server 104 which it transmits it to the client application 3a encapsulated in one or more IP packets.

During this process, the monitoring and control component 112 maintains a running count of the amount data (i.e. the number of Bytes) that are read from the server side TCP socket and then writing to the client side TCP socket. Then, at some point in time, the proxy server 5 receives at the client side socket TCP socket TCP payload data that makes up a subsequent request HTTPs 505. The reception of this data at the client side TCP socket 300 indicates to the monitoring and control component 112 that the data of the first HTTP responses 501 has now fully passed through the proxy server 104 (because a subsequent HTTPs request is not sent by the client application until it receives the previous response) and hence the count of the TCP payload data that makes up the first HTTPs response 503 is now complete.

This process may be repeated for multiple requests and responses, with the proxy server 104 in effect inferring that a set of TCP payload data arriving at the TCP client side socket and then passing through the TCP server side socket relates to a request and that all the TCP payload data that is then subsequently received at the server side TCP socket before a new set of TCP payload data is received at the client side socket 300 relates to a response to that request.

Referring again to FIG. 3, once the monitoring and control component 112 has categorized the dataflow as being an ABR streaming dataflow it continues 417 to monitor the HTTPs requests 419 and HTTP responses 421 of the dataflow and attempts to further categories the dataflow as one that currently comprises ABR segments that are (or predominantly are) of a particular variant of the different segment variants typically made available at the origin server 110.

To that end, the proxy server 104 has access to, and/or maintains a database of information regarding known servers that provide ABR content and typical characteristics of the ABR content provided by those servers. For example, each entry in the database relates to a known ABR origin server and lists common variants used by that server and one or more characteristics of each of those variants.

An example data base entry 600, for the origin server 110, is illustrated in FIG. 5. The database entry 600 lists each of five different segment variants (Var1 to Var 5) known to be available at the origin server 100, and for each variant: the resolution (indicated as horizontal lines of vertical resolution, with p indicting progressive scanning); a recorded average media playback data rate (in Mbps); a recorded average response size (in Mb), and a segment playback duration (in seconds).

It will be appreciated that: the average media play back data rate of any given portion of ABR streamed content is the number of bits in that portion divided by the video playback time of that portion; the average response size of a given variant type is the average number of bits in a response carrying that variant type and the segment playback duration of a given variant type is the video playback time of that segment.

The information in each entry 600 in the database may be obtained in any one of a number of different ways, for example, by performing an a priori statistical analysis of APR video content obtained from the origin server 100, for example, using the techniques described herein or any other suitable technique for obtaining the information. Alternatively, the information in the entry may simply be provided by the operator of the origin server 110.

In order to access the correct entry 600 in the database for the origin server 110, the proxy server 104 must first obtain the identity of the origin server 110 in order to use that identity to query an index of the database.

The proxy server 104 may identify the origin server 110 in a number of different ways. In one example, the proxy server 104 identifies the origin server 110 using information read from one or more messages exchanged between the client 102a and the origin server 110 in the security protocol handshake 405 used to secure the connection between the two. For example, if the security Protocol used is TLS or SSL, the client sends a standard 'CLIENT HELLO' message to the origin server 110 to initiate the handshake 405 and this CLIENT HELLO' message includes the Server Name Identifier (SNI) field which holds the Uniform Resource Locator (URL), e.g. XYZ.com, of the origin server 110. The proxy server 104 may read the SNI field when 'CLIENT HELLO' message when forwarding the 'CLIENT HELLO' message and hence obtain the URL of the origin server 110. Alternatively, the proxy server 104 may parse a message sent from the origin server 110 that includes the origin server's 110 digital certificate which in turn includes the origin server's 110 URL to obtain the URL of the origin server 110.

Alternatively, the proxy server 104 identifies the origin server 110 using information read from one or more of the messages exchanged between the client 102a and the proxy server 104 in the first TCP handshake 401 used to establish the first TCP connection 204a between the two. For example, the initial TCP SYN sent from the client device 102a to the origin server 110 but which is intercepted by the proxy server 104 is carried by an IP packet that has the IP address of the origin server 110 in its destination address field. The proxy server 104 may use this destination IP address as an identifier of the origin server 110, either directly, or by performing a reverse Domain Name Sever (DNS) lookup on the IP address to obtain the corresponding URL of the origin server 110.

Figure 6:
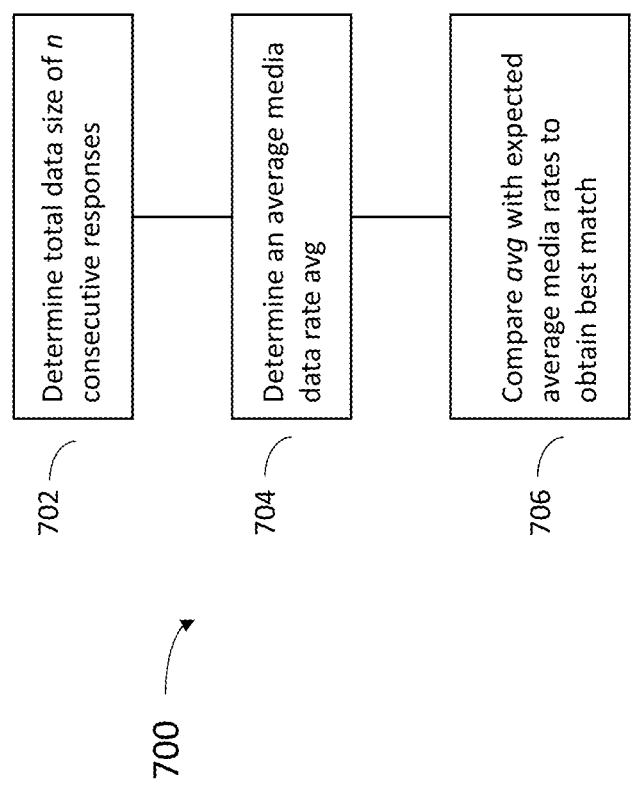
FIG. 6 is a flow diagram illustrating one example method by which a monitoring and control component further categorizes a dataflow.

The flow diagram 700 of FIG. 6 illustrates one example method by which the monitoring and control component 112 further categorizes the dataflow. At step 702, the monitoring and control component 112 determines a total data size of a number n of consecutive HTTPs responses (e.g. by using the method described with respect to FIG. 5 to obtain the data size of each individual response and then summing the data sizes of the n individual responses).

At step 704, the monitoring and control component 112 determines an average media playback data rate of the current dataflow. For example, the monitoring and control component 112 may do this by dividing the total data size of the n consecutive responses by the total video playback time of the segments in those responses. The total video playback time is equal to n multiplied by the playback time t of a segment. In one example, the monitoring and control component 112 obtains t from the entry 600.

At step 706, the monitoring and control component 112 compares the determined average media playback data rate of the current dataflow with the expected average media playback data rates of the variants listed in the entry 600 to obtain a best match. For example, if the monitoring and control component 112 determines an average media playback data rate of the current dataflow as being 0.36 Mbps, a comparison with the information in the entry 600 provides a best match of 0.4 Mbps and the monitoring and control component 112 categorizes the segments in the download as being Variant 1 (i.e. the dataflow is currently at, or predominantly at 1080 HD).

In an alternative example, the monitoring and control component 112 determines the media playback data rate of each of a number of responses (i.e. for each response, the monitoring and control component 112 divides the determined data size of that response by the playback time of a segment) and compares the individual media playback data rate of each response with the expected average media playback data rates of the variants listed in the entry 600 to obtain a best match. If the determined media playback data rate of each of a number (for example three) of consecutive responses each provides a best match with the expected average media play back data rate of the same variant, then the monitoring and control component 112 categorizes the segments in the download as being at that particular variant.

Next, as indicated by 423 in FIG. 3, the monitoring and control component 112 selects a desired target variant from the available variants indicated in the record 600, calculates a bandwidth value to be applied to the first TCP connection 204a in order to cause the client application 102a to request segments of the desired variant and imposes the calculated bandwidth value on the first TCP connection 204a.

The desired target variant may be selected based on any one or more of a number of policy factors, including for example, current overall or cell specific network conditions (if known), time of day, the type of user device (if known), type of subscription plan purchased by a user of the user device (if known) or any other suitable factor.

Figure 7:
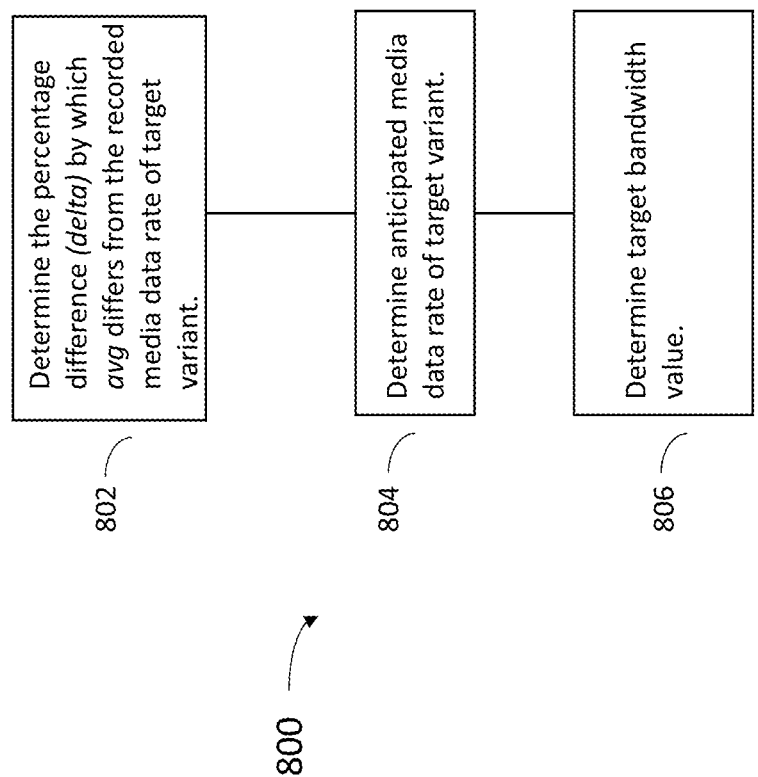
FIG. 7 is a flow diagram illustrating one example method by which a monitoring and control component determines a bandwidth value to be applied to a connection.

The flow diagram 800 of FIG. 7 illustrates one example method by which the monitoring and control component 112 determines the bandwidth value to be applied.

At step 802, the monitoring and control component determines the percentage difference (delta) by which the determined average media playback data rate (avg) of the dataflow differs from the recorded media playback data rate of the variant type that the dataflow has been categorized to. Continuing with the numerical example started above, if the determined average media playback data rate is 0.36 Mbps and the recorded average media playback data rate for Variant 1 is 0.4 Mbps, then delta is equal to 10% (i.e. (0.4−0.36)/0.4).

Next, at step 804, the monitoring and control component 112 determines an anticipated media playback data rate of the target variant by applying the same delta to the value, from the database entry 600, of the recorded media playback data rate for the target variant type.

Continuing further with the numerical example started above, if the target variant is variant 2 (i.e. 720p), then the anticipated media playback data rate of the target variant is 0.18 Mbs (i.e. 0.2−(0.2/10)).

Next, at step 806, the monitoring and control component 112 determines a target bandwidth value based on the anticipated media playback data rate of the target variant. The target bandwidth value is the value that monitoring and control component 112 then imposes on the first TCP connection 204a to try to cause the client 102a to request segments of the target variant (i.e. in this example Var 2–720p).

In one example, the target bandwidth value is calculated to be value that is a fixed percentage higher than the anticipated media playback data rate of the target variant. For example, continuing with the numerical example started above, if the fixed small percentage adjustment is 10%, the target bandwidth value is 0.198 Mbps (i.e. 0.18+(0.18/10)).

The monitoring and control component 112 then artificially adjusts or throttles the bandwidth available on the connection to set that bandwidth is equal to or approximately equal to the target bandwidth value.

The monitoring and control component 112 may accomplish the throttling of the bandwidth on the first TCP connection 204a in one of or a combination of several ways. For example, the monitoring and control component 112 may suitably throttle the rate at which data is read from the server side TCP socket and/or written to the Client side TCP socket. Alternatively or additionally, the monitoring and control component 112 may accomplish the throttling of the bandwidth on the first TCP connection 204a by suitably controlling the TCP congestion algorithm that controls the transmission of TCP data from the proxy server 104 to the client 102a over the first TCP connection 102a.

At the client device 102, the client 102a may detect in one or more of a number of ways that the bandwidth on the TCP connection 204a between the client 102 and the proxy server 104 has been reduced. The client 102a may detect a change in a performance characteristic of the connection 204a that indicates that the bandwidth of the connection 204a has been reduced. For example, the client 102a may detect that segment download times (i.e. the time difference between the time at which the client 102a sends a request for any given segment and the time at which the client 102 receives that segment) have increased, that a buffer that the client 102a uses to store data downloaded over the connection 204a is less full, and/or that the time the client 102a takes to render video frames from the segments is increasing.

In accordance with the particular ABR streaming protocol being used by the client 102a, the client 102a will likely adapt to this change by selecting to request segments from the origin server 110 that are of a lower quality (i.e. media bit rate) that those currently being requested.

As is illustrated in FIG. 3, in this example, the adjusted bandwidth value imposed by the monitoring and control component 112 causes the client 102a to send to the origin server 110 HTTPs requests 425 for segments of the target variant and in reply the origin server 110 sends back HTTPs responses 427 that include segments of the target variant.

The monitoring and control component 112 continues to monitor the dataflow 429 using the methods described above and tracks the media data rate of the data flow. When the tracked media data rate has met appropriate characterization criteria, the monitoring and control component categorizes 431 the flow as now being a flow of the target variant. For example, if the tracked media playback data rate remains within a range defined by an upper threshold slightly above the target variant media playback data rate and a lower threshold slightly below the target variant media playback data rate for a predetermined time period, the monitoring and control 112 component categorizes the dataflow as now being at the target variant.

In the above described example, the target variant (720p) is just one step below in quality of the variant (1080p) that the monitoring and control component 112 initially categorizes the flow as being at. In other examples, the monitoring and control component 112 may select a target variant that is multiple steps below the variant that the monitoring and control component 112 initially categorizes the flow as being at.

In such instances, the monitoring and control component 112 may progressively step down in variants to enforce the required behavior on the client 102, with the effect of eliminating stalling on the client device 102. For example, if the initial dataflow was categorized as being at Variant 3 (i.e. 480p) and the monitoring and control component 112 selects a final target variant of variant 5 (i.e. 240p) then, in the manner described above, the monitoring and control component 112 may first determine and set a bandwidth control value appropriate for the intermediate target variant 4 (i.e. 360p) and then on categorization of the data flow to being at 360p, set a bandwidth control value appropriate for the final 240p target.

Alternatively, if the monitoring and control component 112 selects a final target variant that is multiple steps below the variant type that the monitoring and control component 112 initially categorizes the flow as being, the monitoring and control component 112 may directly apply a bandwidth control value appropriate for the final target variant and not use a multiple step approach.

In all cases, if the monitoring and control component 112 determines that the download has stabilized on a variant type that is not the target variant that a currently applied target bandwidth value has been set for, the monitoring and control component 112 can increase or decreased the target bandwidth value marginally as appropriate. For example, if the target data flow is the 240p variant and that is what the currently applied target bandwidth value has been set to achieve, but the monitoring and control 112 component determines that the download has instead stabilized at the 144p variant, then the monitoring and control component 112 can intelligently increase the applied target bandwidth value so that the client can settle on the 240p variant.

In some examples, the monitoring and control component 112 implements one or more techniques to monitor the playback of the video content at the client 102a to determine whether or not it is likely that the playback is stalling or is approaching stalling. If the monitoring and control component 112 determines that it is likely that the playback is stalling or is approaching stalling it may release the bandwidth control that it is applying on the first TCP connection 204a.

In one technique, the monitoring and control component 112 maintains a running estimate of the total playback time of the content that has been delivered to the client 102a ('delivered content playback time') and also a running count of an estimate of the time that has elapsed since playback began at the client 102a ('actual playback time'). In order for stall free playback of the content at the client 102a, the delivered content playback time needs to be continually greater the actual playback time. If the delivered content playback time becomes only slightly more than or the same as actual playback time it is likely that the playback will stall and if the delivered content playback time becomes less than the actual playback time it is likely that the playback has stalled. The monitoring and control component 112 may maintain an estimate of the delivered content playback time based on the number of responses (and hence segments) delivered to the client 102a and the obtained playback time of those segments. The monitoring and control component 112 may maintain an estimate of the actual playback time at the client as being the time elapsed since the first byte of a response conveying an initial segment was transmitted from the proxy server 104 to the client 102a.

In another technique, the monitoring and control component 112 compares the known play back time of each segment against the estimated time taken to deliver that segment to the client 102a. The client 102a relies on receiving each segment in less time than it is required to play it back in. If the monitoring and control component 112 determines that the delivery time of each of a predetermined number of segments exceeds the playback time of those segments, then the network bandwidth control is having a negative impact and the bandwidth control should be released.

The estimated time taken to deliver any given segment to the client 102a may be taken as being the data size of the response conveying that segment divided by the current determined bandwidth between the proxy server 104 and the client 102a.

In one example if it is determine that n (for example 3) consecutive segments each has an estimated delivery time that is a factor f (for example 3) times greater than the playback time of that segment, then the monitoring and control component 112 determines that the network bandwidth control is having a negative impact and the bandwidth control should be released.

It is known that many ABR media playback client applications provide a menu option to enable a user to manually select which quality variant of the available ABR segments should be downloaded to the client application during a download session. So for example, if the different available quality variant for an ABR media presentation are 1080p, 720p, 480p, 360p, 240p the user may select which of these variants is to be downloaded. Accordingly, while watching an ongoing ABR media presentation, a user may manually select a quality variant (say, 1080p) that has a higher quality than the current variant type (say 480p) that is currently automatically being downloaded by the client application and the user's selection of variant type will override the client application's earlier selection of variant type so that the client application requests the higher quality variant.

In these circumstances, it is possible that if the monitoring and control component 112 is applying bandwidth control to the connection between the proxy server 104 and the client device 102 when a user of the client application 102a has manually selected (or subsequently manually selects) a quality variant and the target bandwidth value currently being applied cannot deliver segments of the manually selected variant type in a timely manner, stalling will ensue to the detriment of the user's viewing experience.

One or more techniques may be implemented to mitigate against this possibility. One such technique that the monitoring and control component 112 may implement takes advantage of the observation that in an established ABR session (i.e. in the period following any initial 'seeding period' at the start of the session in which seeding period a client application may, for example, request an initial low quality variant (e.g. 360P) but then quickly jump to requesting a higher quality variant (e.g. 720P) ignoring any intermediate quality variants (e.g. 480P)), when a client application itself automatically selects to request segment variants that are of a higher quality than the currently selected segments, the client application will select a variant that is a single quality step above the current variant (e.g. again using the 1080p, 720p, 480p, 360p, 240p, example, if the client application 102a is currently downloading 480p segments it will initially next select 720p segments).

Accordingly, in one technique, after categorizing the dataflow as being at a particular variant (which may or may not be the target variant), the monitoring and control component 112 continues to monitor each response conveying a segment in the data flow and, if the monitoring and control component 112 determines using the approach described above that based on the determined size of at least one response, that the segment variant being conveyed by that response is likely a variant that is more than one step above the particular currently classified variant and that the estimated time taken to deliver that segment to the client 102 exceeds the playback time of the segment, the monitoring and control component 112 releases or modifies the bandwidth control (i.e. either stops applying the bandwidth control completely or sets a bandwidth value that can support the timely delivery of that segment). It is envisaged that this technique will be particularly useful in circumstances where a user does manually select a variant type that is more than one step higher than the variant type currently being delivered.

In another technique, after categorizing the dataflow as being at a particular variant (which may or may not be the target variant), the monitoring and control component 112 continues to monitor each response conveying a segment in the data flow and, if the monitoring and control component 112 determines, using the determined sizes of multiple responses, that the segment variants being conveyed by the responses are a higher quality than the target variant and that the bandwidth value currently being applied will not support the timely delivery of that higher quality variant (i.e. playback bit rate of that variant is higher than the current bandwidth value) then, the monitoring and control component 112 releases or modifies the bandwidth control.

This technique may be applied if the monitoring and control component 112 determines that a download actually stabilizes on a variant type that is a higher quality than the one that an applied bandwidth value has been set to achieve.

It is envisaged that this technique will be particularly useful in circumstances where a user has or does manually select a variant type that is one step higher than the variant type that an applied bandwidth value has been set to achieve.

In the above described example, the dataflow occurs over a single split TCP connection 204a, 204b established between the client 102a and the origin server 110. However, it is well known that many video playback client applications running on client devices will cause multiple TCP connections to be opened with a video server when downloading a video from that video server. The multiple TCP connections may be opened sequentially e.g. a first TCP connection may be opened and segments 1 and 2 of the video downloaded over it before the connection is closed and then a second TCP connection is then opened and segments 3 and 4 of the video downloaded over it before the connection is closed and so on.

Accordingly, the proxy server 104 may record the details of a split TCP connection 204a, 204b opened between the client 102a and the origin server 110 and may associate subsequently opened split TCP connections that have the same IP quadruplet (i.e. client IP address and TCP port, server IP address and TCP port) as the first connection as all belonging to same "download event" or dataflow. By effectively aggregating all of these split TCP connections together and treating them as a single split TCP connection, the proxy server 5 is able to monitor the entire downloading of the video and can accurately classify the downloading and control it as described above.

It will be appreciated that in the above described example of each connection being closed after two video segments have been downloaded over it, if each connection were considered separately by the proxy server 104, no connection would be used to download a sufficient number of consecutive video segments (e.g. 3 in the example described above) to make an accurate classification of the download being ABR streaming. This is not the case if the proxy server 104 aggregates the multiple split TCP connections together and treats them as a single split TCP connection for the purposes of monitoring the dataflow.

A client application running on a client device may also cause multiple TCP connections to be opened in parallel in order to download content from a content server using all of the opened TCP connections concurrently. For example a video client application can open multiple concurrent TCP connections to a video content store if the video and audio streams of a video to be downloaded are to be downloaded separately. Alternatively, a video client application may open multiple concurrent TCP connections to a video content store in order to download video segments in parallel to increase overall throughput. As with the example of sequentially opened split TCP connections discussed above, the proxy server 104 may aggregate multiple concurrent split TCP connections together at a session level (based on their common IP quadruplet), effectively treating them as a single split TCP connection, allowing the downloading to be characterized correctly as an ABR streaming download and controlled in the manner described above.

In general, video players will use sets of parallel flows opened sequentially over the duration of the video.

In the example described above with respect to FIG. 3, a secure connection between the client 102a and the origin server 110 is established before the manifest file is downloaded to the client 102a (i.e. the manifest file itself is encrypted). In other examples, the manifest file may be first downloaded to the client 102a over a non-secure connection (i.e. the manifest file is not encrypted) and a secure connection between the client 102a and the origin server 110 is then established for the downloading of the actual video segments.

In some examples, often, if a client and a server establish a first secure TCP connection (i.e. they set up a TCP connection and successfully perform a TLS/SSL handshake over it) and then close that first connection and immediately open a new second TCP connection, in order to secure the second TCP connection, the client and server use an abbreviated TLS/SSL handshake. The abbreviated TLS/SSL handshake re-uses the TLS/SSL session parameters established for the first connection. This avoids having to repeat a full handshake over the second connection but results in the SNI and/or server certificate not being transmitted over the new connection.

In examples where the proxy server 104 aggregates multiple split TCP connections together, effectively treating them as a single split TCP connection, the proxy server 104 is able to make use of domain information that is only obtainable from the full TLS/SSL handshake used over the initially established connection for each of the aggregated connections. For example, as discussed above, the proxy server 104 may use domain information obtained from the full handshake to look up video segment duration information for that domain stored in a database and then use that video segment duration information to determine media bit rates for each of the aggregated connections.

If the second and subsequent split TCP connections were not correlated with the first split connection by the proxy server 104, then this may not be possible.

In other examples, the proxy server 104 may make use of device classification information that classifies the client device 102 as a particular class or type of device and/or client application classification information that classifies the client application 102a as a particular class or type of application in order to infer more detail about the media that is being downloaded from the origin server 110 to the client device 102.

The device or user application classification information may be obtained from the network or from observing other flows involving the client device 102.

For example, if a data flow involving the client device 102 is a non-secure HTTP flow, it is possible for the proxy server 104 to observer the User-Agent Field in the headers of the HTTP messages sent from the client device 102 and the User-Agent field may be used to classify the client device 102 as a mobile device (e.g. a phone) or a desktop device and/or the client application 102a as a mobile app or a desktop app, as the case may be.

Accordingly, if for example, a look-up in the database using an identified domain name of the origin server 110 indicates that the origin server 110 a video store that provides ABR video segments to desktop devices/apps that represent 10 s of playback time but ABR video segments to mobile devices/apps that represent 5 s of playback time, then classifying the user device 102 or the client application 102a as either a mobile device/app or a desktop device/app enables the proxy server 104 to correctly estimate the media bit-rate of the video stream by dividing a response size by 5 s or 10 s depending upon whether the user device 102 or client app 102a is classified as a mobile device/app or as a desk top device/app.

In another example, if it is determined the client device 102 is using a particular operating system and it is known that for that particular operating system ABR segments are always of a particular time duration irrespective of whatever content server is delivering those segments then that segment time duration may be the one used in any of the calculation described above.

In another example, user device classification information may also be used when selecting a target variant or the approach for enforcing the target variant onto the client device. For example, if the monitoring and control component 112 selects a target variant that is multiple steps below the variant that the monitoring and control component 112 initially categorizes a flow as being at, then, depending upon the particular operating system known to be used by the client device, the monitoring and control component 112 may determine to either directly apply a bandwidth control value appropriate for the final target variant (i.e. if the direct approach is known to work well for that type of device) or do so in a multiple step approach (i.e. if the direct approach is known not to work well for that type of device).

In one example, the proxy server 104 is arranged to parse the 'ClientHello' message in a security protocol handshake and identify the set of extensions and cipher suites that are presented in it. This information may be used to infer what type of, or the identity of the, user application 102a involved in the data flow is or what type of client device the client device 102 is. For example, it may be known that client app or device a sends cipher suites {1, 2, 3 4} in that order, client app or device b sends cipher suites {2, 3, 4, 5} and client app or device c may send cipher suites {2, 3, 1, 4} etc and likewise for extensions. Accordingly, observed cipher suites or extensions may be used to query a database of cipher suites or extensions and the particular apps or devices known to use those cipher suites or extensions in order to identify the likely identity of the app or device using the observed cipher suites or extensions.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described hereinbefore.

Figure 8:
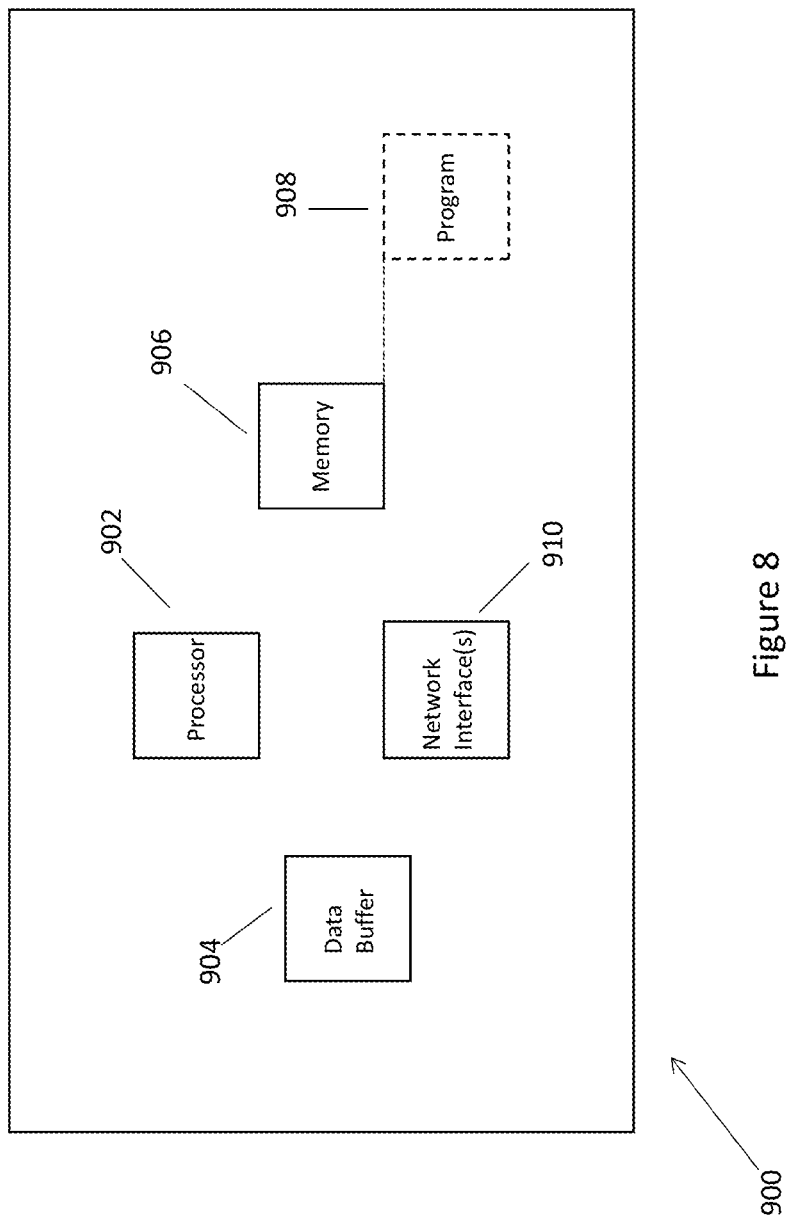
FIG. 8 is a schematic diagram of a proxy server.

Reference is now made to FIG. 8 for illustrating a simplified block diagram of a computer system 900 that is suitable for use in practicing the exemplary embodiments. In particular embodiments, the computer system 900 described in FIG. 5 is configured for communications using the Internet Protocol (IP) suite of standards. In one embodiment, the computer system 900 may be implemented as the proxy server 104.

In an embodiment, the computer system 900 includes processing means such as at least one data processor 902, storing means including a data buffer 904 and at least one computer-readable memory 906 storing computer instruction 908 including an operating system, e.g, Linux. The computer system 900 further includes communicating means such as one or more network interfaces 910 which may be used to receive and send data as described above.

The computer instructions 908 comprises a set of instructions that, when executed by the associated processor 902, enable the computer system 900 to operate in accordance with the exemplary embodiments described above. In these regards the exemplary embodiments may be implemented at least in part by computer software stored on the memory 904, or by hardware, or by a combination of tangibly stored software and hardware (and tangibly stored firmware).

Various embodiments of the computer readable memory 906 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 902 include but are not limited to general purpose computers, special purpose computers, microprocessors, digital signal processors (DSPs) and multi-core processors.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The above exemplary embodiments are to be understood as illustrative examples of the invention. Further embodiments are envisaged. For example, in further embodiments, the intermediate network device 112, rather than determining the size of, or an estimate of the size of, each of the one or more Layer 7 protocol responses by monitoring data flowing through the network device at Layer 4 (i.e. the transport Layer) as described above, may instead do so by monitoring the data flow at Layer 3 (i.e. the IP or network layer instead). This approach would need to take account of IP packet re-transmissions (so that the payloads of re-transmitted packets are not counted multiple times) as well as IP and TCP header overheads.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for controlling bandwidth between a client and a content server in a data network, wherein the method is implemented by an intermediate network entity that is between the client and the content server in the data network;
    monitoring a dataflow, at Layer 4 or below, between the content server and the client, wherein monitoring the dataflow comprises receiving data of one or more responses from the content server, each of the one or more responses being a response to a corresponding one of one or more requests from the client and determining a size of, or an estimate of the size of, each of the one or more responses;
    categorizing the dataflow, based on the monitoring at Layer 4 or below, as being an Adaptive Bit Rate (ABR) streaming dataflow that comprises segments of media data of a particular quality variant of a plurality of quality variants potentially available at the content server, wherein categorizing the data flow comprises using the determined one or more sizes or estimates of sizes of the one or more responses;
    selecting a different quality variant of the plurality of quality variants as a target quality variant;
    determining a bandwidth value to apply to the dataflow to try to cause the client to request segments of media data of the target quality variant for the dataflow; and
    applying the determined bandwidth value to the dataflow.

2. The method of claim 1, wherein the categorizing the data flow comprises comparing at least one of the determined one or more sizes or estimates of sizes of the one or more responses to a record of expected values for the plurality of quality variants potentially available at the content server.

3. The method of claim 1, wherein categorizing the data flow comprises determining an average value of the determined one or more sizes or estimates of sizes of the one or more responses and comparing the average value to a record of expected values for the plurality of quality variants potentially available at the content server.

4. The method of claim 1, wherein categorizing the data flow comprises determining a value for a playback data rate of media in the data flow and comparing the value to a record of expected values for the plurality of quality variants potentially available at the content server.

5. The method of claim 4, wherein categorizing the data flow comprises determining a value for a playback data rate of media in each of a plurality of the responses in the data flow and comparing each of the values to a record of expected values for the plurality of quality variants potentially available at the content server.

6. The method of claim 4, wherein categorizing the data flow comprises determining an average value for a playback data rate of media in the data flow based on a determined data size or estimate of the data size of a plurality of the responses in the data flow and comparing the average value to a record of expected values for the plurality of quality variants potentially available at the content server.

7. The method of claim 1, wherein determining the bandwidth value comprises obtaining from a record a recorded value of a playback data rate of the target quality variant and using the recorded value to determine the bandwidth value.

8. The method of claim 7, the method further comprising determining a value of a playback data rate of media in the dataflow and using the determined value of the playback data rate and the recorded value of the playback data rate of the target quality variant to determine the bandwidth value.

9. The method of claim 8, further comprising determining a delta between the determined value of a playback data rate of media in the dataflow and a recorded value of a playback data rate of the particular variant that the dataflow has been categorized as being, and using the delta and the recorded value of the playback data rate of the target quality variant to determine an anticipated value of a playback data rate of the target quality variant and using the anticipated value to determine the bandwidth value.

10. The method of claim 9, wherein the bandwidth value is set at a higher value than the anticipated value.

11. The method of claim 1, further comprising:
    continuing to monitor the dataflow after the determined bandwidth value has been applied to the data flow;
    determining whether the dataflow now comprises segments of media data of the target quality variant.

12. The method of claim 1, the method further comprising:
    obtaining an identifier of the content server;
    using the identifier to look up information in a database comprising information about ABR content available at the content server;

using the information to select the different quality variant and/or to determine the bandwidth value.

13. The method of claim 1, the method further comprising:
maintaining a first count of an estimate of total playback time of content that has been delivered to the client;
maintaining a second count of an estimate of time that has elapsed since playback of the content began at the client device;
determining, based on the first count and the second count whether to modify or release control of bandwidth on the connection.

14. The method of claim 1, the method further comprising:
determining an estimate of a delivery time of at least one response to the client or an estimated average delivery time of a plurality of responses to the client;
comparing the estimated delivery time or the estimated average delivery time to a known playback time of a segment conveyed in the response or responses;
determining, based at least in part, on the comparison, whether to modify or release control of bandwidth on the connection.

15. The method of claim 1, wherein determining, the size of or an estimate of the size of the one or more responses comprises receiving data at the intermediate network entity from the content server at a server side socket, reading the data from the server side socket and writing the data to a client side socket for onwards transmission to the client.

16. An apparatus for an intermediate network entity for controlling bandwidth between a client and a content server in a data network, the apparatus comprising:
at least one processor;
and at least one memory including computer program code;
the at least one memory and the computer program code being configured to with the at least one processor cause the apparatus at least to perform the steps of:
monitoring a dataflow, at Layer 4 or below, between the content server and the client, wherein monitoring the dataflow comprises receiving data of one or more responses from the content server, each of the one or more responses being a response to a corresponding one of one or more requests from the client and determining a size of, or an estimate of the size of, each of the one or more responses;
categorizing the dataflow, based on the monitoring at Layer 4 or below, as being an Adaptive Bit Rate (ABR) streaming dataflow that comprises segments of media data of a particular quality variant of a plurality of quality variants potentially available at the content server, wherein categorizing the data flow comprises using the determined one or more sizes or estimates of sizes of the one or more responses;
selecting a different quality variant of the plurality of quality variants as a target quality variant;
determining a bandwidth value to apply to the dataflow to try to cause the client to request segments of media data of the target quality variant for the dataflow; and
applying the determined bandwidth value to the dataflow.

17. A non-transitory computer programme readable storage medium comprising a set of computer readable instructions, which, when executed by a processing system causes the system to implement a method for controlling bandwidth between a client and a content server in a data network, wherein the method is implemented by an intermediate network entity that is between the client and the content server in the data network, the method comprising:
monitoring a dataflow, at Layer 4 or below, between the content server and the client, wherein the monitoring the dataflow comprises receiving data of one or more responses from the content server, each of the one or more responses being a response to a corresponding one of one or more requests from the client and determining a size of, or an estimate of the size of, each of the one or more responses;
categorizing the dataflow, based on the monitoring at Layer 4 or below, as being an Adaptive Bit Rate (ABR) streaming dataflow that comprises segments of media data of a particular quality variant of a plurality of quality variants potentially available at the content server wherein categorizing the data flow comprises using the determined one or more sizes or estimates of sizes of the one or more responses;
selecting a different quality variant of the plurality of quality variants as a target quality variant;
determining a bandwidth value to apply to the dataflow to try to cause the client to request segments of media data of the target quality variant for the dataflow; and
applying the determined bandwidth value to the dataflow.

* * * * *